(12) United States Patent  
Haartsen et al.

(10) Patent No.: US 7,996,496 B2
(45) Date of Patent: Aug. 9, 2011

(54) REMOTE USER INTERFACE IN MULTIPHONE ENVIRONMENT

(75) Inventors: Jacobus Haartsen, Hardenberg (NL); Rene Hin, Emmen (NL)

(73) Assignee: Sony Ericsson Mobile Communications AB, Lund (SE)

( * ) Notice: Subject to any disclaimer, the term of this patent is extended or adjusted under 35 U.S.C. 154(b) by 195 days.

(21) Appl. No.: 12/201,353

(22) Filed: Aug. 29, 2008

(65) Prior Publication Data

US 2010/0057882 A1 Mar. 4, 2010

(51) Int. Cl.
*G06F 15/16* (2006.01)
(52) U.S. Cl. ......... 709/219; 709/218; 715/748; 715/738
(58) Field of Classification Search .............. 709/204, 709/217, 231, 226, 230, 246, 237, 219, 218; 725/109, 59; 455/413; 707/732; 715/748, 715/738
See application file for complete search history.

(56) References Cited

U.S. PATENT DOCUMENTS

| | | | |
|---|---|---|---|
| 2003/0120502 A1* | 6/2003 | Robb et al. .................... 705/1 |
| 2004/0139223 A1* | 7/2004 | Caplin ........................ 709/237 |
| 2005/0226166 A1* | 10/2005 | Agrawal et al. ............. 370/252 |
| 2006/0168264 A1* | 7/2006 | Baba et al. ................... 709/230 |
| 2007/0067495 A1* | 3/2007 | Levy ........................... 709/246 |
| 2007/0130108 A1* | 6/2007 | Simpson et al. ................ 707/2 |
| 2007/0136445 A1* | 6/2007 | Sweatt et al. ................ 709/219 |
| 2007/0204008 A1* | 8/2007 | Sindoni ....................... 709/217 |
| 2007/0239688 A1* | 10/2007 | Clark et al. ..................... 707/3 |
| 2007/0239874 A1* | 10/2007 | Lazaridis et al. ............ 709/226 |
| 2007/0260611 A1* | 11/2007 | Bohannon et al. ............. 707/10 |
| 2008/0163318 A1* | 7/2008 | Chen et al. ................... 725/109 |
| 2008/0167015 A1* | 7/2008 | Vishwanathan et al. ...... 455/413 |
| 2008/0172411 A1* | 7/2008 | Kikuchi ................... 707/103 X |
| 2009/0177644 A1* | 7/2009 | Martinez et al. ................ 707/5 |
| 2009/0327241 A1* | 12/2009 | Douillet et al. .................. 707/3 |
| 2010/0211979 A1* | 8/2010 | Konno et al. .................. 725/59 |

FOREIGN PATENT DOCUMENTS

| | | |
|---|---|---|
| WO | 2007/023120 | 3/2007 |
| WO | WO 2007/023120 * | 3/2007 |
| WO | 2008/005047 | 1/2008 |
| WO | 2008/045836 | 4/2008 |

OTHER PUBLICATIONS

International Search Report and Written Opinion for International Application No. PCT/IB2009/000396 dated Sep. 17, 2009.
International Preliminary Report on Patentability for International Application No. PCT/IB2009/000396 dated Aug. 4, 2010.

* cited by examiner

*Primary Examiner* — Le Luu
(74) *Attorney, Agent, or Firm* — Renner, Otto, Boisselle & Sklar, LLP

(57) ABSTRACT

A method of operating a plurality of server devices within a user's personal bubble includes accessing information available on the plurality of server devices. The information is output so as to appear that the information resides on a single device. The remote control device also may automatically configure the various devices within the personal bubble to communicate with other devices based on particular events, commands, etc.

20 Claims, 4 Drawing Sheets

REMOTE USER INTERFACE IN MULTIPHONE ENVIRONMENT

TECHNICAL FIELD OF THE INVENTION

The present invention relates generally to electronic devices, such as electronic devices for engaging in voice communications. More particularly, the invention relates to a system, device and method for controlling devices within a user's personal bubble.

DESCRIPTION OF THE RELATED ART

Mobile and/or wireless items of electronic devices are becoming increasingly popular and are in wide-spread use. In addition, the features associated with certain types of electronic devices have become increasingly diverse. To name a few examples, many electronic devices include cameras, text messaging capability, Internet browsing functionality, electronic mail capability, video playback capability, audio playback capability, image display capability, and navigation capability.

Electronic devices, such as mobile phones, have become a significant part of many people's everyday experiences. To make these experiences as pleasing as possible, it is desirable that the electronic devices are easy to use and carry. While ease of use generally can be addressed via enhancements to the electronic device's software, in certain environments or situations, issues cannot be addressed via software alone.

For example, it may be inconvenient to use an electronic device in a moving vehicle. Additionally, due to the small form factor of the device, it may be difficult to control and/or view a movie played on the electronic device. To address these issues, accessories have been developed to make use of the electronic devices easier and more enjoyable. Such accessories typically are communicatively coupled to the electronic device via a wireless communication link.

A user's WPAN (wireless personal area network), which also may be referred to as a user's "personal bubble", may include, for example, an electronic device, such as a mobile phone, and a wireless accessory, such as a wireless headset. In this configuration, the mobile phone can wirelessly stream audio content to the headset and, if the headset includes a remote display unit, the mobile phone also can wirelessly stream video content.

SUMMARY

In addition to the above-referenced electronic devices and accessories that may be used within the user's personal bubble, a remote control device also may be brought into the personal bubble. The user, via the remote control device, can browse files stored on the mobile telephone (e.g., such as contacts, appointments, audio and video tracks, etc.), initiate commands (e.g., initiate a call, accept a call, send a text message, etc.), configure the electronic device (e.g., call preferences), or any one of a number of other possible options.

As electronic devices become more affordable, many users may carry multiple electronic devices (e.g., a personal phone and a business phone). However, the same user will typically only carry a single headset, or a single remote display. When carrying multiple electronic devices with a single headset, a problem arises with integrating the multiple electronic devices with the headset and/or the remote control device.

In accordance with the present invention, there is provided an architecture wherein the remote control device can be a master controller of the user's personal bubble. Based on the user's preference, the user can browse various server devices (e.g., multiple mobile phones, computers, etc.) in his personal bubble via the remote control device, wherein the browsed data appears to be on a single device. Further, based on items selected from the list, the remote control device can configure the specific server device that contains the content to communicate with a content interface device (e.g., a headset, remote display, etc.).

For incoming communications, the remote control device facilitates a direct connection between the electronic device (e.g., a ringing phone) and the accessory (e.g., the headset). For outgoing communications, the proper electronic device can be selected based on selections made on the remote control device (e.g., business or personal phone), and the selected electronic device can be automatically connected to the accessory.

For reproducing media content, such as, for example, audio or video content, the remote control device may accumulate a list of the audio/video data from the various electronic devices and present the list such that the content appears to reside on a single device. Then, based on user selections, the remote control device facilitates the connection from the accessory (headset or remote display) to the proper electronic device (the business phone or the personal phone) that contains the audio/video data.

According to one aspect of the invention, a method of operating a plurality of server devices within a user's personal bubble includes: using a remote control device to communicate with the plurality of server devices to obtain data indicative of content available to the plurality of server devices; and the remote control device outputting the data.

According to one aspect of the invention, outputting the data includes arranging the data to appear as if it resides on a single device.

According to one aspect of the invention, said personal bubble further includes at least one content interface device, the method further including selecting at least part of the output data; and based on said selection, the remote control device automatically connecting the at least one content interface device to the server device corresponding to the selected data.

According to one aspect of the invention, the method further includes streaming content from the server device to the content interface device, said content corresponding to the selected data.

According to one aspect of the invention, the streamed content is at least one of media content stored on the plurality of server devices, or communication data specific to one of the plurality of server devices.

According to one aspect of the invention, the method further includes receiving an incoming communication on one of the plurality of server devices that is not connected to the content interface device; and automatically connecting the content server device to the one server device.

According to one aspect of the invention, the method further includes automatically pausing any content streamed to the content interface device while the communication is active, and automatically resuming the streamed media content when the communication is terminated.

According to one aspect of the invention, outputting the data includes displaying the data on a display device.

According to one aspect of the invention, displaying the data includes at least one of displaying the data on an output device of a remote control device, or displaying the data on an output device of the at least one content interface device.

According to one aspect of the invention, outputting the data includes at least one of outputting a list of media content stored on each of the plurality of server devices, or outputting a list of incoming communications on each of the plurality of server devices.

According to one aspect of the invention, the method further includes: selecting the incoming communication for output on the at least one content interface device; and automatically connecting the at least one content interface device to the server device in which the incoming communication is being received.

According to one aspect of the invention, outputting the data includes storing the data from each of the plurality of server devices in memory of the remote control device, and combining the stored data so as to form a single list.

According to one aspect of the invention, the server devices are at least one of a mobile phone, a computer, a media player, a gaming device, a pager, an electronic organizer, or a personal digital assistant, and the at least one content interface device is at least one of a wireless headset or a wireless display device.

According to one aspect of the invention, the personal bubble further includes at least one content interface device, the method further including: selecting at least part of the output data; and based on said selection, the remote control device automatically connecting to at least one content interface device and automatically connecting to at least on server device corresponding to the selected data and relaying the information between the at least one content interface device and the at least one server device.

According to one aspect of the invention, a system for operating electronic devices within a user's personal bubble includes: a plurality of wireless server devices within the personal bubble; and at least one wireless remote control device within the personal bubble, said remote control device communicatively coupled to said plurality of server devices, wherein said remote control device is adapted to access data available on the plurality of server devices, and to output the data.

According to one aspect of the invention, the remote control device is adapted to output the data so as to appear that said data resides on a single device.

According to one aspect of the invention, the system further includes at least one wireless content interface device within the personal bubble, wherein said remote control device is communicatively coupled to said content interface device.

According to one aspect of the invention, the remote control device is a master in a piconet, and the plurality of server devices and the at least one content interface device are slaves in the piconet.

According to one aspect of the invention, said remote control device is adapted to configure one of the plurality of server devices as a master of the content interface device.

According to one aspect of the invention, said remote control device is adapted to configure the content interface device to communicate with the master server device.

According to one aspect of the invention, remote control device is adapted to configure the one of the plurality of server devices and the content interface device to be sniffing slaves in the remote control piconet.

According to one aspect of the invention, said server devices are at least one of a mobile phone, a computer, a media player, a gaming device, a pager, an electronic organizer, or a personal digital assistant, and said content interface device is at least one of a wireless headset or a wireless display device.

According to one aspect of the invention, a remote control device for operating a plurality of server devices and at least one content interface device, each device within in a user's personal bubble, the remote control device including: a processor; memory operatively coupled to said processor; and logic stored in said memory and executable by said processor, said logic including logic adapted to access data available on the plurality of server devices, and logic adapted to output the data so as to appear said data resides on a single device.

According to one aspect of the invention, the remote control device includes: logic adapted to select at least part of the output data based on a user input; and logic adapted to automatically connect the at least one content interface device to the server device corresponding to the selected data.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
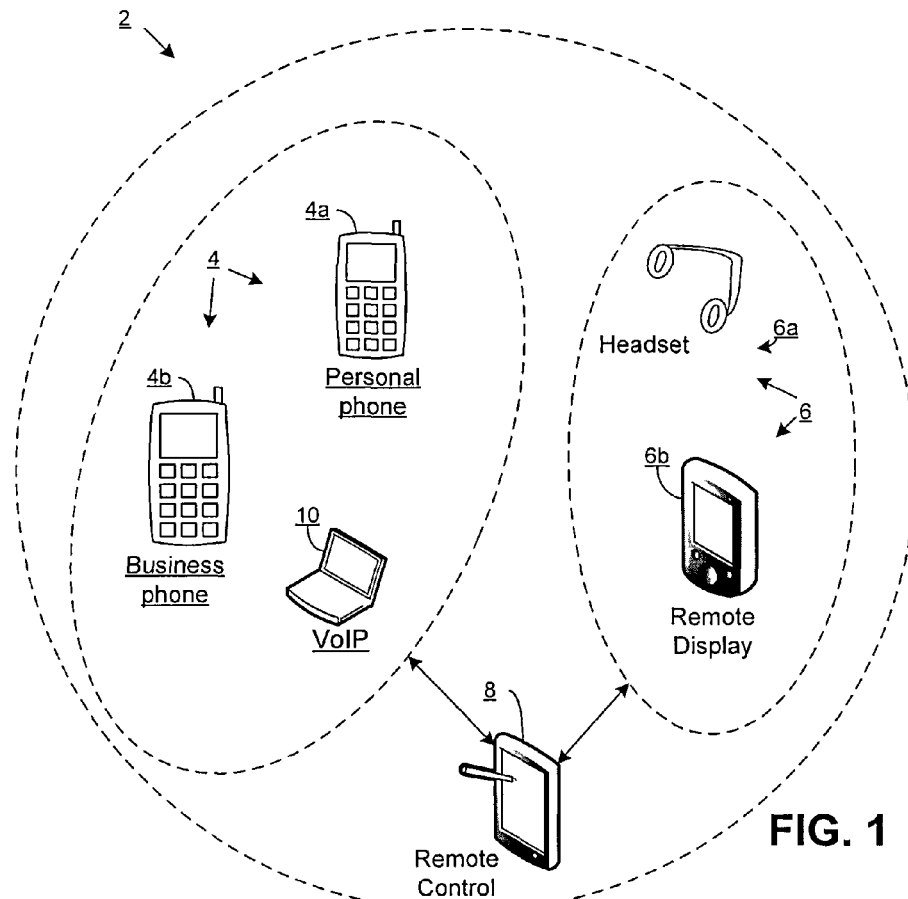
FIG. 1 is a schematic diagram of an exemplary personal bubble for a particular user.

Embodiments of the present invention will now be described with reference to the drawings, wherein like reference numerals are used to refer to like elements throughout. It will be understood that the figures are not necessarily to scale.

In the present document, embodiments are described primarily in the context of a portable radio communications device, such as the illustrated mobile telephone and headset. It will be appreciated, however, that the exemplary context of a mobile telephone and headset is not the only operational environment in which aspects of the disclosed systems and methods may be used. Therefore, the techniques described in this document may be applied to any type of appropriate electronic device and/or accessory, examples of which include a mobile telephone, a media player, a gaming device, a computer, a pager, a communicator, an electronic organizer, a personal digital assistant (PDA), a smart phone, a portable communication apparatus, remote display device, etc.

Electronic devices, such as mobile phones, are in widespread use throughout the world. It is common for an individual to have multiple phones on his person, such as a business phone and a personal phone. However, the same user will typically have only a single headset and/or remote display. Since the headset and remote display typically can be communicatively coupled to only a single mobile phone, a problem arises when the coupled mobile phone is not the phone that is receiving or making the call, and/or the coupled phone does not include the media content in which the user wishes to play.

To easily control the respective phones and accessories, a remote user interface (UI), which can be implemented in various forms including a watch or a pen, can be included in the user's personal bubble. As used herein, a personal bubble refers to a zone of at least ten meters around the user in which the user may wirelessly couple to any one of the devices within the bubble. With reference to FIG. 1, an exemplary personal bubble 2 is shown, wherein multiple mobile phones 4 (e.g., a personal phone 4a and a business phone 4b), and audio/video accessories 6 (e.g., a headset 6a and a display 6b) are operative in the bubble 2. The devices on the right side of the bubble 2 (i.e., the accessories) may be thought of as content interface devices, while the devices on the left of the bubble 2 (i.e., the phones 4, computer 10) may be thought of as server devices and/or access points to a wireless network (e.g., computer network a phone network, etc). As used herein, a content interface device is any electronic device that receives content from another device, and provides a means for outputting the content to a user. The output may be in the form of an audio or video signal, for example. A server device, as used herein, is any electronic device that grants access to a network and/or media content.

The media content may be audio or video data, including any of the various known standards for storing such content, including mp3, wmv, mpeg, divx, jpg, tiff, etc. Further, the media content may be stored on one or more of the server devices, or be accessible by one or more of the server devices.

Also shown in FIG. 1 is a remote control device 8 (e.g., a pen user interface or pen UI). Although the remote control device 8 is illustrated as having a pen and tablet form factor, it will be appreciated that the context of a pen and tablet form factor is merely exemplary, and the remote control device may take on other form factors, examples of which include a watch, pad, lip stick, a pen (without the tablet), etc. The remote control device 8 may include a plurality of buttons (not shown) and a display (e.g., an LCD display). Alternatively, the remote control device 8 may include a touch sensitive display, with or without buttons.

The remote control device 8 also includes a wireless communication means adapted to enable the exchange of information between the remote control device 8, the server devices, (e.g., mobile phones 4 and computer 10) and the content interface devices (e.g., accessories 6). In one embodiment, the wireless communication means is a radio transceiver that is operative to communicate using a short range communication standard, such as the Bluetooth standard. In another embodiment, the wireless communication means is an optical transceiver that is operative to transmit and receive optical signals in the infrared spectrum. As will be appreciated, other wireless communication means may be utilized in place of the above-referenced communication means.

As will be described in more detail below, the remote control device 8 facilitates interactions between the devices on the left and right sides of the personal bubble 2. More specifically, the remote control device 8 can coordinate operation of the multiple devices (e.g., phones 4a and 4b, and computer 10) on the left side of the bubble 2 with the single headset 6a and/or single remote display 6b on the right side of the bubble 2. Moreover, only the headset 6a (and possibly the remote display 6b) and the remote control device 8 need to be within the user's reach (e.g., on his body). The phones 4 and/or computer 10 can be anywhere, provided they are at least within the user's personal bubble 2.

Operation of the remote control device 8 in conjunction with the mobile phones 4 and accessories 6 will now be described with respect to two possible operational scenarios. In a first operational scenario, a user prefers that all incoming calls be directed to the headset, regardless of which phone is receiving the call. In a second operational scenario, the user wishes to stream media content from one or more devices on the left side of the bubble 2 to the headset 6a and/or display 6b. Although only two scenarios are provided, it should be appreciated that depending on the particular devices within the personal bubble 2, any number of different operational scenarios can be carried out.

Beginning with the first operational scenario, as an incoming call (e.g., a conventional wireless call, a VoIP call, etc.) is received on one of the phones 4 (or computer 10), the remote control device 8 can detect the incoming call, and prompt the user whether or not to accept the call. The prompt may be by way of an audible tone, video display or a combination of audio and video. The audio may be emitted by the remote control device 8 itself, and/or the remote control device 8 may command the headset 6a to emit a signal that alerts the user of the incoming call. Also, the audio can be specific to the phone receiving the call (e.g., tone "1" for the business phone, and tone "2" for the personal phone). If the signal is a video signal, then the alert may be displayed on a display of the remote control device 8 and/or on the remote display 6b. The alert can include, for example, an identifier such as a name and/or number of the calling party (e.g., the calling phone number). If multiple phones are receiving a call, then the prompt may include a listing of each call. The user, via the remote control device 8, then may decide to accept the call or reject the call (e.g., by actuating a button or touching a portion of the remote's display corresponding to the desired action).

If there are multiple incoming calls, then the user, via the remote control device 8, is presented with a list of incoming calls, and he may select which call to answer. Thus, even though multiple devices are receiving a call, the user is presented with a single interface to decide how to handle the received calls.

If the user accepts the call, then the remote control device 8 automatically activates the particular phone 4a, 4b (or computer 10) that is receiving the call (e.g., commands the phone to answer the call, or, if multiple calls, the phone that was selected by the user), and automatically couples the phone to the headset 6a so as to enable two-way wireless communications with the caller. If the user rejects the call, then no coupling occurs between the phone and the headset. Further, the remote control device 8 may instruct the phone 4 to cease ringing and/or send the call to voice mail, for example.

For outgoing calls, the user, prior to initiating the call, may wish to check the address book on one of the phones 4. To check the address book, the user, via the remote control device 8, can select whether the call will be a business call, a personal call, a VoIP call, text message, etc. This can be accomplished, for example, by via a menu displayed on the remote control device's display and/or on the remote display 6b. After making the selection, the remote control device 8 can be used to browse for contacts in the address book of the phone 4 corresponding to the specified call. For example, if the user selected a business call, then the remote control device can access and/or retrieve the address book stored in the business phone, and then display the address book (e.g., on the remote control device's display and/or on the remote display 6b). If the user identified a personal call, then the personal phone's address book may be accessed/retrieved and displayed.

Alternatively, the address books of each phone 4 can be merged in memory of the remote control device 8 so as to appear as one address book. For example, the remote control device 8 can retrieve the address books from both phones 4 and combine them into a single address book within memory of the remote control device 8. The merged address book then can be displayed on the remote control device's display and/or on the remote display 6b, and the user may select an address from the list. Depending on which number of the merged address book the user selects, the remote control 8 can automatically select the appropriate phone 4 (e.g., the business phone for business contacts), place the call on the selected phone, and couple the headset 6a to the selected phone so as to enable wireless communications between the headset and the selected phone.

Thus, information available to each server device within the personal bubble can be presented to the user in an easy to understand manner. Further, and regardless of whether the address book (or other information) is presented from one server device or from multiple server devices, the information is presented such that it appears to be from a single device.

In the described embodiment, after accepting an incoming call or selecting a number for an outgoing call, the remote control device 8 facilitated the direct connection between the appropriate phone 4 and the remote device 6. In an alternative embodiment, the remote control device 8 may act as a relay node between the phone 4 and the accessory 6. That is, all communications between the phone 4 and accessory 6 flows via the remote control device 8.

Moving now to a second operational scenario, the user may wish to stream music to the headset 6a (e.g., a stereo headset) or video to the display 6b, or a combination thereof. Prior to streaming the content, the user needs to select or otherwise identify which content he wishes to stream from one or both of the phones 4. To assist the user in making this selection, the remote control device 8 can access the respective phones 4 and display the available content stored therein. The displayed content of each phone (or of another device in the personal bubble 2, such as the computer 10) may be filtered based on the device that has access to the content, or the content of the respective phones may be merged in memory of the remote control device 8 to form a single list. From the content listing, the user, via the remote control device 8, may select the particular content to be streamed to the accessory 6, and command the streaming to begin. The remote control device 8 then can activate the phone or other device that contains the media content, couple the phone/device to the headset 6a and/or display 6b, and initiate the streaming process. Alternatively, the remote control device 8 may act as a relay node streaming the content received from the phones 4 or computer 10 to the accessories 6.

Should a call be received by one of the mobile phones 4 while the content is being streamed, the user can be notified via the remote control 8, headset 6a and/or display 6b as described above. For example, a message may displayed on the remote control device 8, or on the remote display 6b, wherein he message alerts the user of the incoming call. Additionally or alternatively, an audible signal may be communicated via the remote and/or headset 6a. The user then may choose to interrupt the streaming process and accept the call, or to ignore the call. (e.g., via buttons corresponding to the desired action).

If the user ignores the call, then the ringer of the phone may be silenced, and the streaming process may continue. If the user decides to accept the call, then the remote control device 8 can interrupt the streaming process (e.g. by sending a signal to the streaming device to pause the stream). If the call is received on a mobile phone 4 that is currently providing the streamed content, then the connection between the phone 4 and the headset 6a may be maintained. If the call is received on a phone 4 not providing the content, then the remote control device 8 can automatically switch the accessory from the phone providing the content to the phone that is receiving the call. Further, the remote control can automatically resume the content once the call has ended (e.g., switch the accessory back to the appropriate phone and resume the stream).

To enable the remote control device 8 to control the devices within the personal bubble 2, a simple scatternet scenario may be employed, wherein the remote control device 8 is the master of the personal bubble 2. More specifically, the remote control device 8 can be the master in a piconet to which all of the remaining devices are coupled via a low power sniff mode. For heavy activity, such as content browsing on the phones 4 and/or computer 10, the remote control device 8 may place the device (the phones or computer) into a more active mode so as to enable fast data exchange. In addition to the phones 4 and the computer 10, the accessory 6 (e.g., headset 6a and/or remote display 6b) are also communicatively coupled to the remote control 8 so as to receive and transmit data to/from the remote control device 8.

In coordinating operation of the respective devices in the personal bubble 2, the remote control device 8 may configure the respective devices to communicate to one another. For example, the remote control device may configure the headset 6a to be connected as a slave to one of the phones 4. The remote control device 8 may provide the proper timing and address information for the headset 6a and/or phone 4 so that an ad-hoc connection can be quickly established. In this scenario, it is preferred that the phone 4 acts as a master to the headset 6a and/or display 6b, but remains a sniffing slave in the remote control piconet such that the user may still control the phone 4 via the remote control device 8 (the phone 4 can be in scatternet where the sniff function takes very little power from the phone due to the low duty cycle of the sniff function). The headset 6a also may be maintained in a sniff mode to the remote control device 8 such that the remote control device also can control the headset 6a (or display 6b).

For an outgoing call, the remote control 8 can first load address books from the respective phones 4a and 4b (e.g., via a high-speed ad-hoc link) to memory of the remote control device 8. The address book of the respective phones then can be presented to the user as a single address book, or segregated based on the phone. In the event there are overlapping addresses, the user may select between business or personal addresses. Upon the user selecting an address, the remote control device 8 activates the corresponding phone 4 and a direct connection can be established between the headset 6a (and/or monitor 6b) and the phone 4 (or computer 10) corresponding to the selected address. In certain situations, certain addresses may be preferred over other addresses. For example, if a contact has a VoIP address, it may be preferred (e.g., automatically selected) for cost reasons.

For the streaming scenario, the remote control device 8 can collect identifiers for all content stored in the phones 4 and/or computer 10, and then present the content to the user as one list (similar to the combined address list discussed above). When the user selects a particular audio or video track from the available content, the corresponding phone 4 (or computer) is activated and the headset 6a and/or display 6b can be automatically connected as a slave to that streaming device. If an incoming call is received on another device (e.g., a different phone), the remote control device 8 may first send an audio and/or video signal to the headset 6a and/or remote display 6b so as to notify the user of the call without stopping the stream. If the user accepts the call, the remote control 8 can stop the streaming device and facilitate a direct connection between the headset 6a and the device receiving the call.

Figure 3:
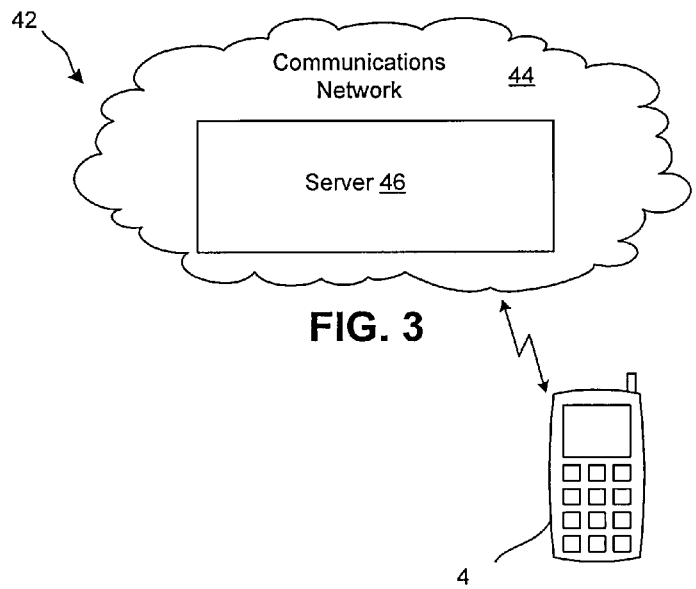
FIG. 3 is a schematic diagram of a communications system in which the mobile telephone of FIG. 2 may operate.
Figure 4:
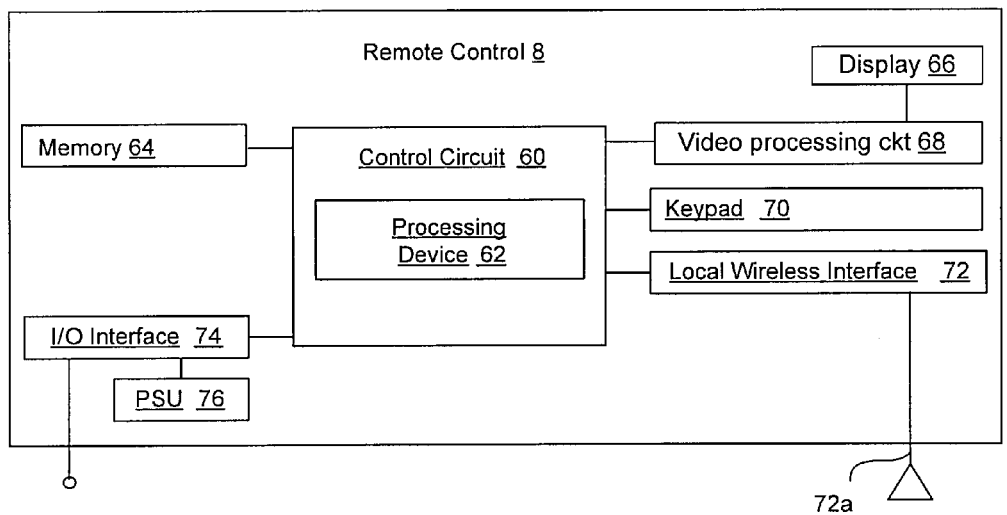
FIG. 4 is a schematic block diagram of the relevant portions of an exemplary remote control device in accordance with an embodiment of the present invention.
Figure 5:
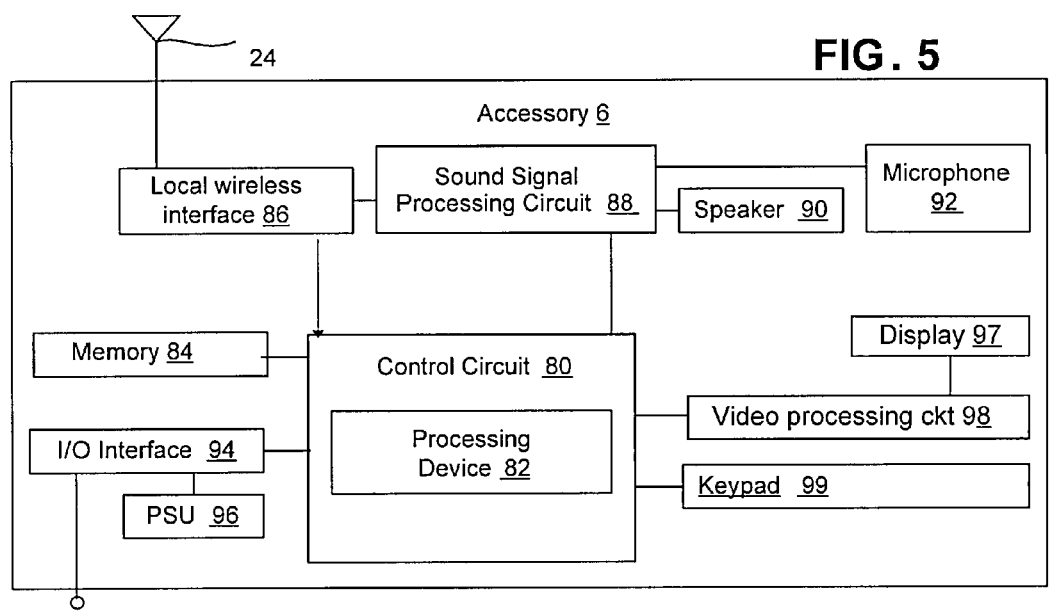
FIG. 5 is a schematic block diagram of the relevant portions of an exemplary accessory.

Moving now to FIGS. 2-5, there is shown block diagrams for an exemplary mobile phone (FIG. 2), remote control device 8 (FIG. 4), and accessory 6 (FIG. 5). Beginning with FIG. 2, the exemplary mobile phone 4 may include a display 14. The display 14 displays information to a user such as operating state, time, telephone numbers, contact information, various navigational menus, etc., which enable the user to utilize the various features of the mobile phone 4. The display 14 also may be used to visually display content received by the mobile phone 4 and/or retrieved from a memory 16 of the mobile telephone 4.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Keys or key-like functionality also may be embodied as a touch screen associated with the display 14. Also, the display 14 and keypad 18 may be used in conjunction with one another to implement soft key functionality.

The mobile phone 4 includes a primary control circuit 20 that is configured to carry out overall control of the functions and operations of the mobile phone 4. The control circuit 20 may include a processing device 22, such as a CPU, microcontroller or microprocessor. The processing device 22 executes code stored in a memory (not shown) within the control circuit 20 and/or in a separate memory, such as the memory 16, in order to carry out operation of the mobile phone 4.

The memory 16 may include a read only memory area that is implemented using nonvolatile memory, and a random access or system memory area that is implemented using volatile memory. Data may be exchanged between the nonvolatile memory and the volatile memory as is conventional. The nonvolatile memory and the volatile memory may be sized as appropriate for the mobile phone 4 or other electronic device in which the memory 16 is used.

Figure 2:
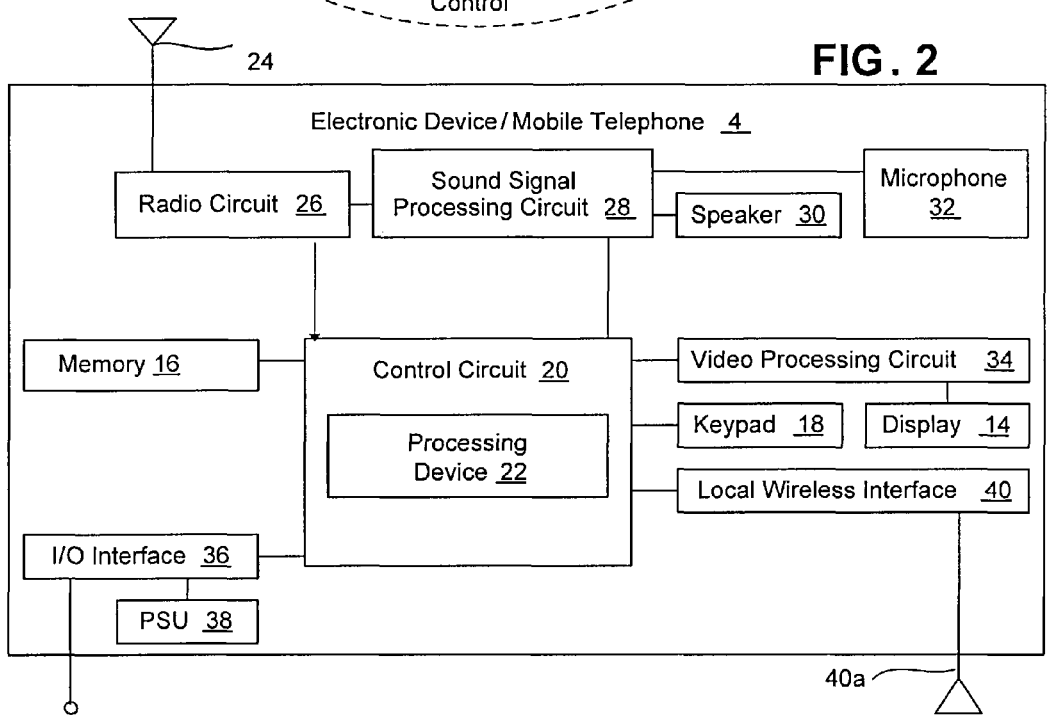
FIG. 2 is a schematic block diagram of the relevant portions of an exemplary mobile telephone.

Continuing to refer to FIG. 2, the mobile phone 4 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile phone 4 further includes a sound signal processing circuit 28 for processing audio signals transmitted by and received from the radio circuit 26. Coupled to the sound processing circuit 28 are a speaker 30 and a microphone 32 that enable a user to listen and speak via the mobile phone 4 as is conventional. The radio circuit 26 and sound processing circuit 28 are each coupled to the control circuit 20 so as to carry out overall operation.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream that is received by the radio circuit 26 or obtained by any other suitable method.

The mobile phone 4 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile phone 4 to a battery charger to charge a battery of a power supply unit (PSU) 38 within the mobile phone 4.

The mobile phone 4 also may include a local wireless interface 40 (coupled to antenna 40a), such as an infrared transceiver and/or an RF interface (e.g., a Bluetooth interface, a ZigBee interface, a WiFi interface etc. as well as advanced versions of these standards), for establishing communication with an accessory 6, a remote control device 8, another mobile radio terminal, a computer or another device.

With additional reference to FIG. 3, the mobile phone 4 may be configured to operate as part of a communications system 42. The system 42 may include a communications network 44 having a server 46 (or servers) for managing calls placed by and destined to the mobile phone 4, transmitting data to the mobile phone 4 and carrying out any other support functions. The server 46 communicates with the mobile phone 4 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 44 may support the communications activity of multiple mobile telephones 4 and other types of end user devices.

As will be appreciated, the server 46 may be configured as a typical computer system used to carry out server functions and may include a processor configured to execute software containing logical instructions that embody the functions of the server 46 and a memory to store such software.

Moving now to FIG. 4, there is shown a block diagram of an exemplary remote control device 8. The remote control device 8 includes a primary control circuit 60 that is configured to carry out overall control of the functions and operations of the remote control device 8. The control circuit 60 may include a processing device 62, such as a CPU, microcontroller or microprocessor, that executes code stored in a memory (not shown) within the control circuit 62 and/or in a separate memory, such as memory 64, in order to carry out operation of the remote control device 8.

The memory 64 may include a read only memory area that is implemented using nonvolatile memory, and a random access or system memory area that is implemented using volatile memory. The nonvolatile memory and the volatile memory may be sized as appropriate for the remote control device 8.

The remote control device 8 may include a display 66 for displaying information to the user (e.g., operating state, time, telephone numbers, contact information, various navigational menus, etc.). The display 66 also may be used to visually display content received by the remote control device 8 and/or retrieved from the memory 64 of the remote control device 8. The display 66 may be coupled to the control circuit 60 via a video processing circuit 68, which converts video data to a video signal used to drive the display 66.

A keypad 70 provides for a variety of user input operations, such as select, call accept, call reject, initiate call, etc. Keys or key-like functionality also may be embodied as a touch screen associated with the display 66. Also, the display 66 and keypad 70 may be used in conjunction with one another to implement soft key functionality.

The remote control device 8 also may include a local wireless interface 72 (coupled to antenna 72a), such as an infrared transceiver and/or an RF interface (e.g., a Bluetooth interface), for establishing communication with an accessory 6, a mobile radio terminal, a computer or another device.

The remote control device 8 may further include one or more I/O interface(s) 74 (e.g., one or more electrical connectors). The I/O interface(s) 74 may be used to couple the remote control device 8 to a battery charger to charge a battery of a power supply unit (PSU) 76 within the remote control device 8.

In addition, the processing device 62 may execute code that implements the remote user interface functionality of the remote control device 8. It will be apparent to a person having ordinary skill in the art of computer programming, and specifically in application programming for electronic devices, how to program a remote control device 8 to operate and carry out logical functions associated with the remote user interface functionality based on the description herein. Accordingly, details as to specific programming code have been left out for the sake of brevity. Also, while the remote user interface functionality is executed by the processing device 62 in accordance with a preferred embodiment of the invention, such functionality could also be carried out via dedicated hardware, firmware, software, or combinations thereof, without departing from the scope of the invention. Any of these implementations may be referred to as a remote user interface function circuit or simply a logic circuit.

Moving now to FIG. 5, there is shown a block diagram for an exemplary accessory 6 (e.g., an accessory embodied as a wireless headset 67a) that may be used in accordance with the invention. The accessory 6, like the phone and remote, also includes a primary control circuit 80. The control circuit 80 is configured to carry out overall control of the functions and operations of the accessory 8, and may include a processing device 82, such as a CPU, microcontroller or microprocessor. The processing device 82 executes code stored in a memory (not shown) within the control circuit 82 and/or in a separate memory, such as memory 84, in order to carry out operation of the remote accessory.

The memory 84 may include a read only memory area that is implemented using nonvolatile memory, and a random access or system memory area that is implemented using volatile memory. The nonvolatile memory and the volatile memory may be sized as appropriate for the accessory 6.

The accessory 6 includes a local wireless interface 86, such as an infrared transceiver and/or an RF interface (e.g., a Bluetooth interface), for establishing communication with the remote control device 8, a phone 4, a computer 10 or other device.

The accessory 6 may further include a sound signal processing circuit 88 for processing audio signals transmitted by and received from the local wireless interface 86. Coupled to the sound processing circuit 88 are a speaker 90 and a microphone 92 that enables a user to input and receive voice data as is conventional. The local wireless interface 86 and sound processing circuit 88 are each coupled to the control circuit 80 so as to carry out overall operation.

The accessory 6 may further include one or more I/O interface(s) 94 (e.g., one or more electrical connectors). The I/O interface(s) 94 may be used to couple the accessory 6 to a battery charger to charge a battery of a power supply unit (PSU) 96 within the accessory 6. Also, and although not shown, the accessory may include a remote video display device, such as an LCD display, for example.

The accessory 6, like the remote control device 8, may include a display 97 for displaying information to the user (e.g., operating state, time, telephone numbers, contact information, various navigational menus, etc.). The display 97 also may be used to visually display content received by the accessory 6 and/or retrieved from the memory 84 of the accessory 6. The display 97 may be coupled to the control circuit 80 via a video processing circuit 98, which converts video data to a video signal used to drive the display 97.

Figure 6:
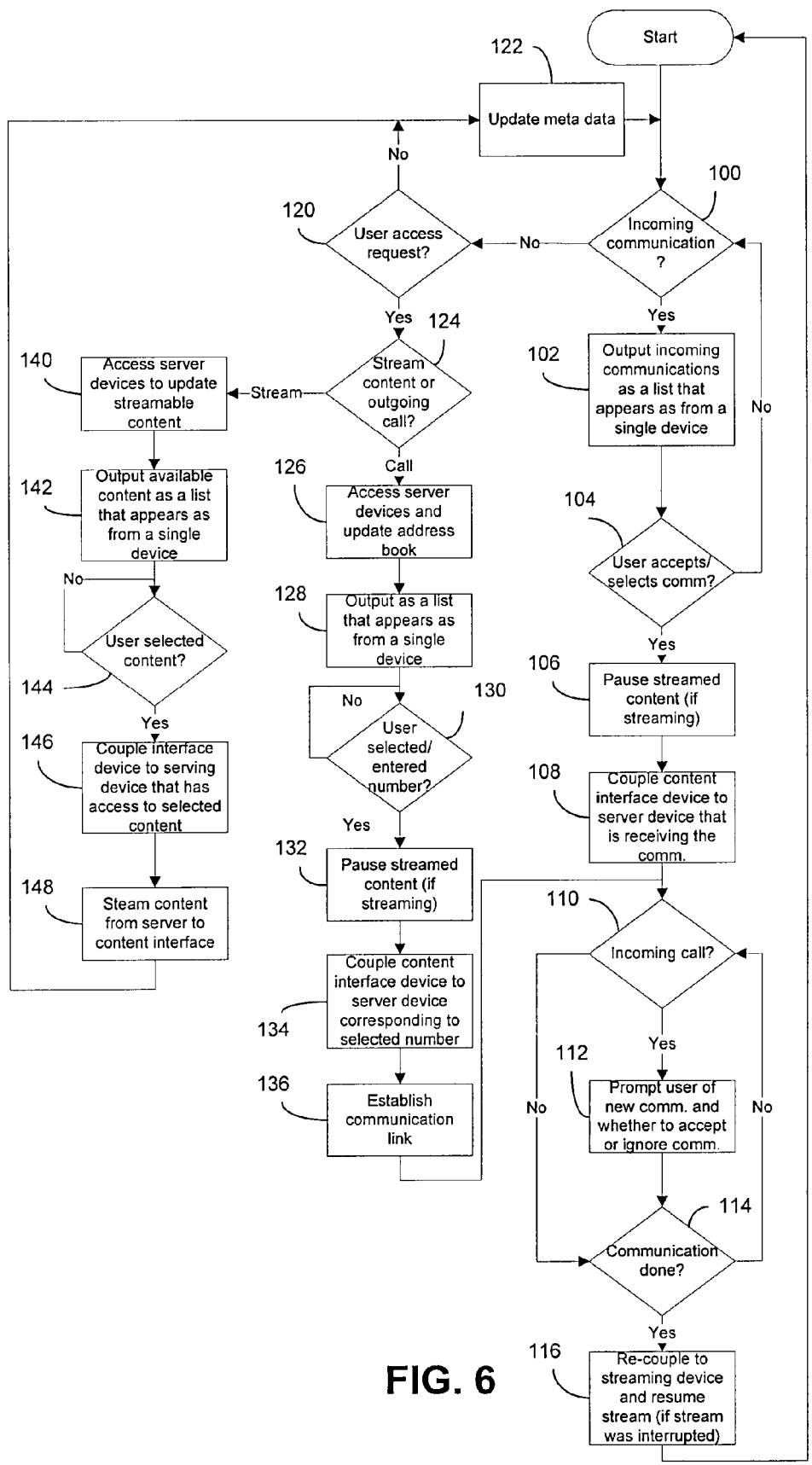
FIG. 6 is a flow chart illustrating the steps of an exemplary method for controlling devices in a user's personal bubble in accordance with the invention.

A keypad 99 provides for a variety of user input operations, such as select, call accept, call reject, initiate call, etc. Keys or key-like functionality also may be embodied as a touch screen associated with the display 97. Also, the display 97 and keypad 99 may be used in conjunction with one another to implement soft key functionality. Referring now to FIG. 6, illustrated are logical operations to implement an exemplary method of operating a remote control device 8 so as to control devices within a user's personal bubble 2. The exemplary method may be carried out by executing logic within the remote control device 8, for example. Thus, the flow chart of FIG. 6 may be thought of as depicting steps of a method carried out by the remote control device 8. Although FIG. 6 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

The logical flow may begin in block 100 wherein the remote control device 8 determines if an incoming communication (e.g., a phone call, a video call, a text message, an email, etc.) is being directed to one or more devices (e.g., the personal phone 4a, the business phone 4b, etc.) within the user's personal bubble 2. Such detection may be by way of a short range wireless interface (e.g., Bluetooth) that communicatively couples the remote control device 8 to each phone 4 as is conventional. Then, the occurrence of an incoming communication can be communicated to the remote control device 8 via the short range wireless interface.

If an incoming communication is detected, then at block 102 the remote control device 8 assembles a message that informs the user of the incoming communication and outputs the message, e.g., on a display of the remote control device 8 and/or on the remote display 6b. The message can include, for example, an identifier of the party originating the communication, such as a number identifier (e.g., a phone number), a name identifier, an email identifier or any other information that enables the user to determine who is originating the communications. Further, the message may be formatted such that it appears to be from a single device, even though the message information may be from multiple devices. For example, if multiple messages are received by the personal phone 4a and the business phone 4b at substantially the same time (or before the user has a chance to review the incoming messages on the screen), then the remote control device 8 can output those messages as a single list. Then, the user then can quickly scan the list and determine which, if any, of the messages he wishes to receive.

At block 104, if the user decides not to accept the incoming message(s) (e.g., he does nothing or initiates an ignore command via the accessory or remote), then the communication is not acted upon and the method moves back to block 100. However, if the user decides to accept the incoming communication, he may do so by indicating the request on the remote control device's display (e.g., by selecting the communication on the display and then initiating an accept command). Upon accepting the communication, at block 106 the remote control device 8 instructs the phone(s) 4 to pause any content that is being streamed to the accessory 6 (e.g., pause any video or music being streamed from a device in the user's personal bubble to the accessory 6). At block 108 the accessory 6 is communicatively coupled to the phone 4 receiving the communication, and the phone 4 is commanded to answer the call (or perform another function corresponding to the type of communication). In coupling the accessory to the phone, the accessory may be a slave to the phone. Further, both the phone and the accessory may remain in a sniff mode to the remote control device 8. Alternatively (not shown), the remote control device 8 establishes a traffic link to both the phone 4 and the accessory 6 and acts as a relay node between the two.

While the communication is ongoing, the remote control device 8 may continue to monitor for additional incoming communications within the personal bubble 2, as indicated at block 110. If a new communication is not detected, then the method moves to block 114. If another communication is detected, then at block 112 the remote control device 8 notifies the user of the communication as described above with respect to the initial communication(s). The user then can determine if he wishes to accept the new communication, or remain with the current communication. Accepting or ignoring the new communication may be done in a manner similar to that described above.

Next at block 114, it is determined if the current communication is completed (e.g., is the call ongoing or has it been terminated?). If the communication is still ongoing, then the method moves back to block 110 and repeats. However, if the communication is completed, then the remote control device 8 automatically re-couples the accessory 6 to the device (e.g., phone 4 or computer 10) that was supplying the streamed content (assuming streaming was paused at block 106). Further, the remote control device 8 instructs the phone or computer to resume play of the content.

Referring back to block 100, if an incoming communication is not detected, then the method moves to block 120 wherein it is determined if the user wishes to browse and/or access information available to any of the devices in his personal bubble 2. If the user does not wish to browse/access information on any of the devices in the bubble 2, then at block 122 the remote control device 8 updates metadata for each device in the personal bubble 2. The metadata comprises information that can be used to identify content stored on the respective devices. By periodically updating metadata, information updates (e.g., new contact information, new media content information, etc.) made on any device in the user's personal bubble 2 can be readily available, thereby improving system response. This facilitates display of such information when the user wishes to browse the respective devices.

If the user does wish to browse/access devices in his personal bubble 2, then at block 124 it is determined if the user wishes to initiate an outgoing communication or stream media content (e.g., audio and/or video content). If the user wishes to initiate an outgoing communication (e.g., a call, a text message, etc.), then the method moves to block 126, wherein the remote control device 8 may automatically access contact information (e.g., address books, etc.) stored on the devices within the user's personal bubble 2. More specifically, the remote control device 8 may first access the metadata stored in memory to build an initial contact list, and then can wirelessly communicate with each device in the personal bubble 2 to check if there is new information in the respective devices that is not reflected in the metadata. Such new information can be transferred to the remote control device 8, and then the information (i.e., information stored in the metadata and the newly acquired information) can be assembled and output as a single list, for example, on its display and/or on the display 6b, as indicated at block 128.

For example, if the personal phone 4a and the business phone 4b are within the user's personal bubble 2, then the remote control device 8 can retrieve and assemble the contact information stored in both the personal phone and the business phone, and place the information in the remote control device's memory. Further, the remote control device 8 can assemble and output the contact information so as to appear as it originates from a single device. The user then can browse the contact information on the remote control device's display and select a contact in which to initiate the communication, as indicated at block 130.

Upon selection and initiation of the communication by the user, the remote control device 8 can automatically command devices in the personal bubble 2 that may be streaming content to the accessory 6 to pause the stream, as indicated at block 132. For example, the remote control device 8 can wirelessly communicate to devices in the personal bubble 2 and determine which, if any, are streaming content to the accessory 6. The remote control device 8 then can command such devices to pause the stream.

At block 134, the remote control device 8 can determine which of the devices within the personal bubble 2 corresponds to the selected contact. For example, the remote control device 8 may store in memory an identifier with each contact, wherein the identifier corresponds to the device from which the remote control device 8 obtained the contact information. Then, once the user has selected a contact, the remote control device 8 can check the identifier to determine which device corresponds to the selected contact. Based on the determination, the remote control device 8 can couple the accessory 6 to device corresponding to the contact, and at block 136, command the device to initiate the communication (e.g., place a call). Alternatively (not shown), the remote control device 8 establishes a traffic link to both the phone 4 and the accessory 6 and acts as a relay node between the two. Next, the method can move to block 110 and execute blocks 110-116 as described above.

Moving back to block 124, if instead of placing a communication the user wishes to stream media content to the accessory, then the method moves to block 140. At block 140, the remote control device 8 again accesses the devices within the user's personal bubble 2. However, instead of retrieving contact information, the device automatically retrieves information that identifies media content stored on or accessible by each device in the personal bubble 2. The media content, for example, may be audio content (e.g., music), video content (e.g., movies, image content (e.g., pictures).

Again, the remote control device 8 may first access the metadata stored in memory to build an initial media content list, and then wirelessly communicate with each device in the personal bubble 2 to check if there is new media content in or available to the respective devices that is not reflected in the metadata. Such new information can be wirelessly transferred to the remote control device 8, and then the information (i.e., information stored in the metadata and the newly acquired information) can be assembled. Also stored in memory may be identifiers that indicate which devices in the personal bubble 2 have access to the respective media content. The remote control device 8 then can output the list of available media content on its display device, or on the display device 6b, wherein the output list gives the appearance that the media content is on a single device, as indicated at block 142. The user than can select media content from the list at block 144.

Once the media content has been selected by the user, the remote control device 8 determines which of the devices contain or have access to the selected content, and automatically couples the accessory 6 to the device, as indicated at block 146. At block 148, the remote control device 8 commands the device coupled to the accessory 6 to stream the content.

When the first media content has been completed, the next selected item is automatically streamed to the accessory 6. If the next selected item resides on a device different from the one currently coupled to the accessory 6 (e.g., the first content was on the personal phone 4a, and the second content was on the business phone 4b), then the remote control device 8 can terminate the current communication link between the device and the accessory, establish a new communication link between the other device and the accessory, and command the other device to stream the content to the accessory.

Accordingly, the remote control device enables a user to easily operate multiple server devices in conjunction with a single content interface device in the personal bubble.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of operating a plurality of server devices within a user's personal bubble via a wireless personal area network, the personal bubble defined as a volume extending up to ten meters around the user, comprising:
   using a remote control device to communicate with the plurality of server devices via the personal area network, the plurality of server devices located in the personal bubble; and
   the remote control device
   i) automatically accessing the plurality of server devices to obtain data indicative of content available to each of the plurality of server devices;
   ii) combining the data indicative of content available to each of the plurality of server devices; and
   iii) outputting the combined data on a display device corresponding to the remote control device, wherein the output combined data is arranged such that the content corresponding to the output combined data appears to reside on a single device.

2. The method according to claim 1, wherein said personal bubble further includes at least one portable content interface device, the method further comprising:
selecting at least part of the output data; and
based on said selection, the remote control device automatically communicatively coupling the at least one content interface device to a server device of the plurality of server devices corresponding to the selected data.

3. The method according to claim 2, further comprising streaming content from the server device to the content interface device, said content corresponding to the selected data.

4. The method according to claim 3, wherein the streamed content is at least one of media content stored on the plurality of server devices, or communication data specific to one of the plurality of server devices.

5. The method according to claim 3, further comprising:
receiving an incoming communication on one of the plurality of server devices that is not communicatively coupled to the content interface device; and
automatically communicatively coupling the content interface device to the one server device.

6. The method according to claim 1, wherein said personal bubble further includes at least one content interface device, the method further comprising:
selecting at least part of the output data; and
based on said selection, the remote control device automatically communicatively coupling to the at least one content interface device and automatically communicatively coupling to at least one server device corresponding to the selected data, and transferring the selected data between the at least one content interface device and the at least one server device.

7. The method according to claim 1, wherein outputting the data includes at least one of outputting a list of media content stored on each of the plurality of server devices, or outputting a list of incoming communications received by each of the plurality of server devices.

8. The method according to claim 7, further comprising:
selecting the incoming communication for output on the at least one content interface device; and
automatically communicatively coupling the at least one content interface device to the server device in which the incoming communication is being received.

9. The method according to claim 1, wherein outputting the data includes storing the data from each of the plurality of server devices in memory of the remote control device, and combining the stored data so as to form a single list.

10. The method according to claim 1, wherein the server devices are at least one of a mobile phone, a computer, a media player, a gaming device, a pager, an electronic organizer, or a personal digital assistant, and the at least one content interface device is at least one of a wireless headset or a wireless display device.

11. The method according to claim 1, wherein the plurality of server devices comprise at least one mobile phone, and the remote control device facilitates a connection between the at least one mobile phone and a content interface device located in the personal bubble.

12. The method according to claim 11, wherein the content interface device comprises a portable communications headset.

13. A system for operating electronic devices within a user's personal bubble via a wireless personal area network, the personal bubble defined as a volume extending up to ten meters around the user, comprising:
a plurality of wireless server devices; and
at least one wireless remote control device, said remote control device communicatively couplable to said plurality of server devices and including a display device, wherein said remote control device is configured to
i) automatically access the plurality of server devices that are located within the personal bubble to obtain data indicative of content available to each of the plurality of server devices,
ii) combine the data indicative of content available to each of the plurality of server devices, and
iii) output the combined data on the display device, wherein the output combined data is arranged such that the content corresponding to the output combined data appears to reside on a single device.

14. The system according to claim 13, further comprising at least one wireless content interface device within the personal bubble, wherein said remote control device is communicatively couplable to said content interface device.

15. The system according to claim 14, wherein the remote control device is configured as a master in a piconet, and the plurality of server devices and the at least one content interface device are configured as slaves in the piconet.

16. The system according to claim 15, wherein said remote control device is configured to configure one of the plurality of server devices as a master of the content interface device.

17. The system according to claim 15, wherein said remote control device is configured to configure the content interface device to communicate with the master server device.

18. The system according to claim 17, wherein said remote control device is configured to configure one of the plurality of server devices and the content interface device to be sniffing slaves in the remote control piconet.

19. The system according to claim 13, wherein said server devices are at least one of a mobile phone, a computer, a media player, a gaming device, a pager, an electronic organizer, or a personal digital assistant, and said content interface device is at least one of a wireless headset or a wireless display device.

20. A remote control device for operating a plurality of server devices and at least one content interface device, each device located within in a user's personal bubble, the personal bubble defined as a volume extending up to ten meters around the user, the remote control device comprising:
a processor;
memory operatively coupled to said processor;
a display device operatively coupled to said processor;
a local wireless interface operatively coupled to said processor and configured to communicate with devices in a wireless personal area network; and
logic stored in said memory and executable by said processor, said logic including
logic configured to use the local wireless interface to automatically access the plurality of server devices that are located within the personal bubble to obtain data indicative of content available to each of the plurality of server devices,
logic configured to combine the data indicative of content available to the plurality of server devices, and
logic configured to output the combined data on the display device, wherein the output combined data is arranged such that the content corresponding to the output combined data appears to reside on a single device.

* * * * *